US006611271B2

(12) United States Patent
Harper et al.

(10) Patent No.: US 6,611,271 B2
(45) Date of Patent: *Aug. 26, 2003

(54) COMPACT DISK HAVING ASSOCIATED DISPLAY

(75) Inventors: Richard H. Harper, Newbury (GB); Michael G. Molloy, Caxton (GB); Marc B. Rene, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/104,100

(22) Filed: Mar. 21, 2002

(65) Prior Publication Data

US 2002/0105841 A1 Aug. 8, 2002

Related U.S. Application Data

(63) Continuation-in-part of application No. 09/324,593, filed on Jun. 3, 1999, now Pat. No. 6,476,817.

(51) Int. Cl.[7] .................................................. G06T 1/60
(52) U.S. Cl. ........................ 345/530; 360/131; 360/133
(58) Field of Search .............................. 345/84, 85, 97, 345/530, 23, 24; 360/131, 133, 135

(56) References Cited

U.S. PATENT DOCUMENTS

| | | | |
|---|---|---|---|
| 5,389,945 A | | 2/1995 | Sheridon ...................... 345/85 |
| 5,485,560 A | * | 1/1996 | Ishida et al. ................. 395/133 |
| 5,708,525 A | | 1/1998 | Sheridon ...................... 345/85 |
| 5,745,102 A | | 4/1998 | Bloch et al. ................. 345/185 |
| 5,754,332 A | * | 5/1998 | Crowley ..................... 359/296 |
| 6,054,071 A | * | 4/2000 | Mikkelsen, Jr. ............. 264/1.36 |
| 6,476,817 B1 | * | 11/2002 | Harper et al. ............... 345/530 |

* cited by examiner

Primary Examiner—Matthew C. Bella
Assistant Examiner—Mackly Monestime
(74) Attorney, Agent, or Firm—R. Hutter

(57) ABSTRACT

A removable memory media, such as a compact disk, has an alterable alphanumeric display thereon. The display comprises an array of elements, such as bichromal balls, which can be selectably altered in appearance. A head associated with a port for accepting the disk creates images in the display when the disk is ejected from the port, thus allowing the disk to be automatically labeled incidental to use.

12 Claims, 2 Drawing Sheets

COMPACT DISK HAVING ASSOCIATED DISPLAY

CONTINUATION-IN-PART APPLICATION

The present application is a continuation in part of U.S. patent Ser. No. 09/324,593, filed Jun. 3, 1999 now U.S. Pat. No. 6,476,817.

INCORPORATION BY REFERENCE

U.S. Pat. No. 5,389,945, assigned to the assignee hereof, is hereby incorporated by reference.

FIELD OF THE INVENTION

The present invention relates to removable data storage media as used with, for example, computers and other data-processing devices, such as compact disks. In particular, the present invention relates to a system whereby such removable media can be automatically labeled for visual identification thereof.

BACKGROUND OF THE INVENTION

Removable data storage media, such as compact disks, are well known in the computer industry. A single compact disk may have loaded thereon data which varies with every use of the compact disk. A common practical problem in environments where removable media such as compact disks are in widespread use is that it is inconvenient for users to label and re-label various compact disks with information relating to the data stored on the compact disk at any particular time. Labeling a compact disk in the first instance is often inconvenient to begin with, and subsequent crossing out or erasing of any written label on a compact disk is merely an opportunity for confusion.

The present invention relates to a design of a compact disk (or other type of removable data storage media) which enables automatic visual labeling of the media as it is used.

DESCRIPTION OF THE PRIOR ART

U.S. Pat. No. 5,745,102 discloses an electro-optical display for a floppy disk. The apparatus utilizes a modified disk housing and a modified disk drive to automatically label the disk with file names being copied to or deleted from the disk. Disposed on the disk housing is an electronic display such as an LCD display, as well as a receiving device for receiving digital data, and a logic/memory device coupled to the receiving device and the display. While the disclosure in this patent represents a disk or other media with an electrically-alterable display, the rather sophisticated arrangement of a processor and an LCD display on a disk will represent a serious cost disadvantage to each disk.

U.S. Pat. Nos. 5,389,945 and 5,708,525 are examples of patents which disclose an "electric paper" concept. In the particular embodiments shown in these patents, a substrate has embedded therein a two-dimensional arrangement of "bichromal balls," each ball having essentially a white hemisphere and a black hemisphere, and each ball being rotatable within the substrate. By external electrostatic or magnetic manipulation of the balls within the substrate, individual bichromal balls can be oriented to have their black hemisphere or their white hemisphere oriented in a particular direction. By selectively orienting various balls in the two-dimensional array, the black hemispheres of certain balls can be oriented such that the hemispheres can collectively form alphanumeric characters. Significantly, the electrical, electrostatic or electromagnetic devices which selectably orient the bichromal balls within the substrate are external to the substrate itself.

Another technology similar in concept to "electric paper" is being developed by E Ink™ of Cambridge, Mass. In the E Ink™ concept, small transparent spheres filled with dark blue fluid and white particles are sandwiched between pieces of clear film. Electrical currents applied to the film control the movements of the particles within the spheres, pushing them up or drawing them down. A description of the E Ink concept is given in the article "Firm Turns a Page in Designing Prototype Flexible Display," San Jose Mercury News, Jul. 20, 1998.

SUMMARY OF THE INVENTION

According to one aspect of the present invention, there is provided a memory media, comprising a member for retaining data, and an electrically-alterable display associated with the member, the display being alterable through means which are not attached to the member and wherein there is no circuitry attached to the member.

According to another aspect of the present invention, there is provided a data processing device, comprising a port for accepting a memory media, the memory media including a member for retaining data, and a display associated with the member, the display being alterable through means which are not attached to member and wherein there is no circuitry attached to the member; and means for altering the display while the computer memory media is disposed in the port.

DETAILED DESCRIPTION

Figure 1:
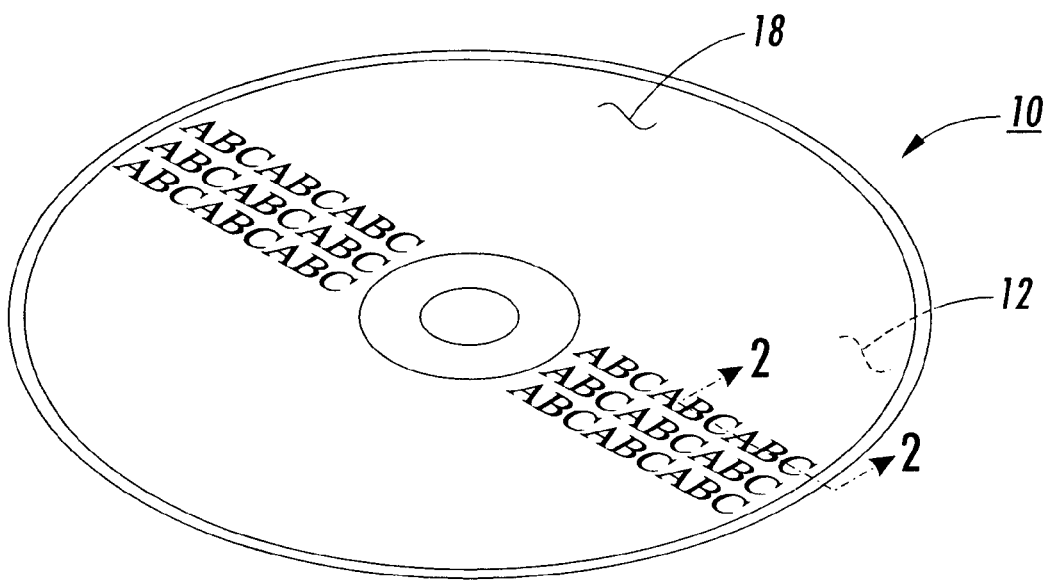
FIG. 1 shows a removable computer memory media, in the form of a compact disk, incorporating the present invention.

FIG. 1 shows a removable computer media, in this particular case a compact disk 10, incorporating an electrically alterable display according to the present invention. The disk 10 defines a data-bearing side 12, which is facedown in the Figure: as is known in the art, such a compact disk retains digital data by defining a set of readable "pits" or other structures, which are writable and readable by use of, for example, a laser. (Of course, although the phrase "compact disk" is used to apply to a popular media for retaining digital data as of the filing hereof, it is to be expected that other structures for retaining digital data will become available in the future, and the present invention, within the scope of the claims, shall apply to the later formats as well.) On the opposite side of the data-bearing side 12 is a display 18. Display 18 is preferably of such a size to accommodate a reasonable number of alphanumeric characters which may appear on the display. These alphanumeric characters are used to label the compact disk 10 with particular identifying data. Display 18 thus serves as an electrically alterable display or label attached to compact disk 10.

Figure 2:
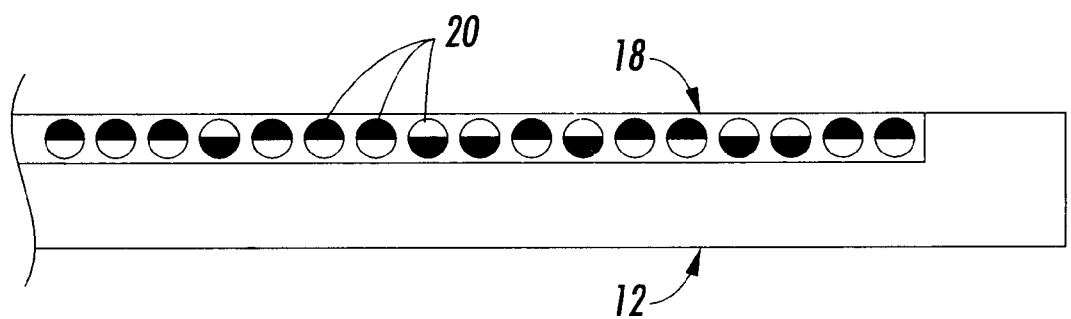
FIG. 2 is a sectional view through line 2—2 of FIG. 1, showing a detail of a compact disk according to the present invention.

FIG. 2 is a sectional view through line 2—2 of a portion of the disk 10, showing a structure of "bichromal balls," as generally described in the patents referenced above. In brief, there is provided just below the top surface of display 18 an evenly-distributed population of bichromal balls 20, each ball 20 being disposed in a cavity defined in the structure of the disk. Each ball 20 defines, in general, a black hemisphere and a white hemisphere: by the influence of an external electric or magnetic force, one or the other hemisphere is made to face the surface of display 18, and thereby make the small area above the particular ball 20 appear black or white. A large quantity of such balls 20 over an area can be used to create alphanumeric characters on other images on display 18. The characters or images, significantly, endure after the forces creating the image are removed.

With specific reference to the claims herein, the display 18 is an electrically alterable display which is alterable through means which are not attached to the member. Specifically, display 18 is of such a construction that the application of what is here called electrical energy (but which term can also include magnetic, electro-magnetic, or electrostatic energy) can be used to alter information which is visible on display 18. Preferably, according to the present invention, there is no ancillary circuitry associated with the display 18: any electrical devices which serve to alter the information displayed on display 18 would be placed external to the compact disk 10 such as within a computer or other data-processing device (such as a digital printer, audio-visual device, bar code scanner, infrared or radio receiver, etc.)

Depending on the specific implementation, the structure forming display 18 can be affixed to the bulk of the digital-data-bearing member forming surface 12, such as in a sheet which is attached to the member with an adhesive or a fastener, or can be formed directly in the member. In either case, with regard to the claims below, the display shall be considered "attached" to the member which bears the digital data.

Figure 3:
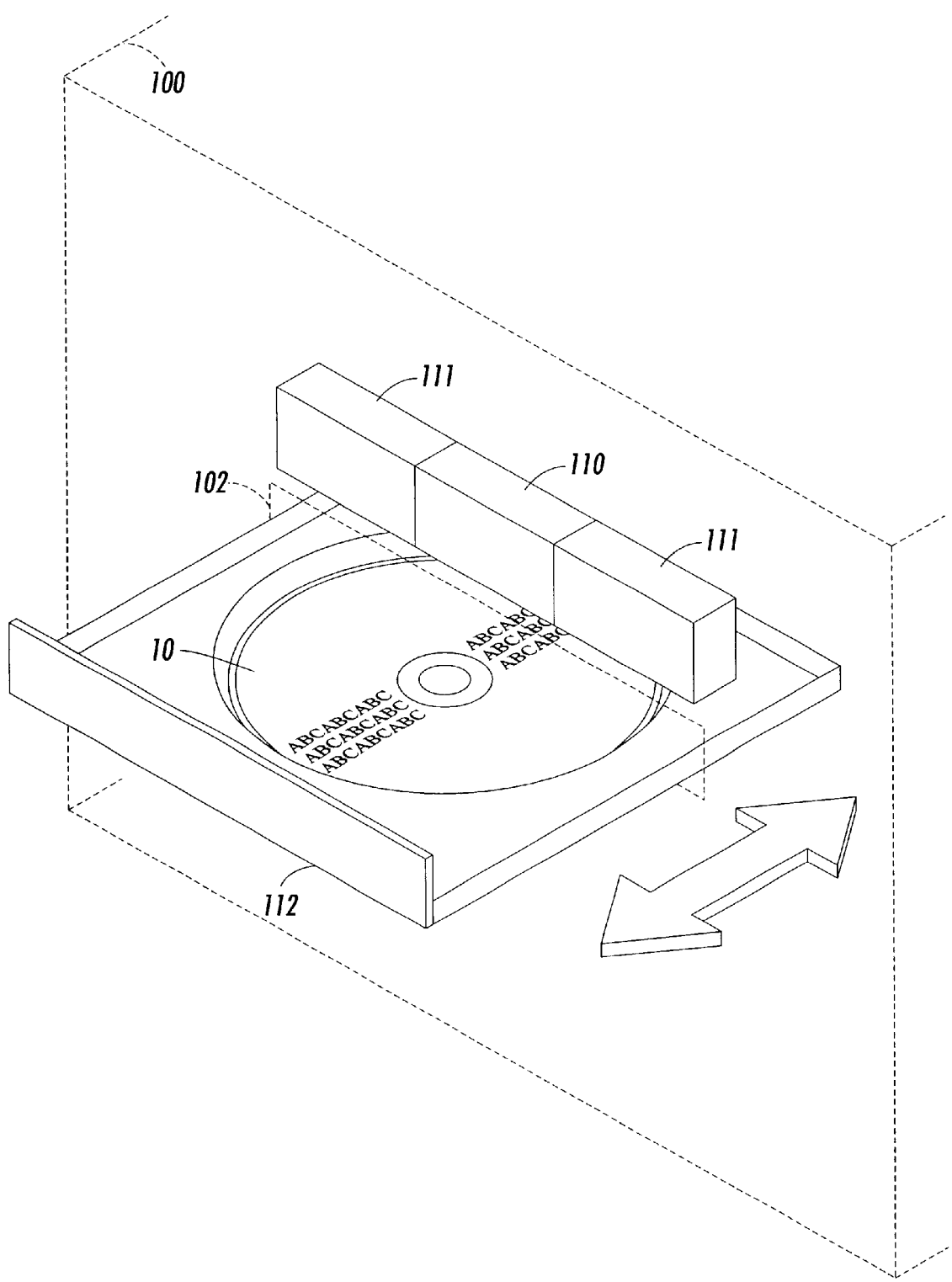
FIG. 3 is a perspective view of a compact disk inserted into the port of a computer, according to the present invention.

FIG. 3 is a view showing a compact disk 10 according to the present invention removably disposed within a computer (or other information-processing device, such as a printer or audio-visual device) 100, a portion of which is shown in phantom in the figure. As is typical in office equipment, the compact disk 10 is inserted for use in a port 102 on an exterior surface of the computer 100, and as such would include a disk-drive apparatus (not shown) for reading and/or writing digital data on what is here shown as the underside of the disk 10. There is provided what is here called simply a "head" 110. Head 110 includes means for selectably charging (or, in an alternate embodiment, magnetizing) small areas within the main surface of display 18 when a compact disk 10 is inserted in port 102. Digital image data to form characters or other images is supplied to head 110 when a series of small areas of the display 18 move near it. As will be described in detail below, electrostatic charging of small areas within display 18 will cause the areas to turn black (or some other color) to form the desired alphanumeric characters as each small area moves past the head 110. Such addressable heads, of the magnetic or electrostatic variety, are known in the context of, for example, the "electric paper" patents referenced above.

As is shown in the FIG. 3 embodiment, the disk 10 sits in a drawer 112 which opens out of port 102, in a manner familiar in the art of compact disk drives. The drawer can be assisted by a motor (not shown) or other mechanical means to ensure that the motion of drawer 112, and thus the motion of the disk 10 past head 110 is of a reasonably constant velocity when the drawer 112 is opened or closed. The constant velocity of the motion of drawer 112, in combination with the action of head 110, allows the head 110 to make the desired alphanumeric characters or other images on display 18 disk 10, particularly when the drawer 112 is being opened to remove the disk 10.

In a preferred embodiment of the present invention, it is desired to place alphanumeric characters on display 18 which relate to the data stored on the disk 10 at any particular time. A suitable time to cause the display 18 to display certain alphanumeric characters is when the compact disk is expelled from port 102 immediately following a use in computer or other device 100. Thus, according to the present invention, every time the compact disk 10 is expelled from port 102 and thereby moves past head 110, it will be effectively labeled or re-labeled with suitable title data which identifies the data on the compact disk 10. The alphanumeric data for determining what characters to place on the disk 10 at any time can be derived from a control system (not shown) associated with the computer or audio-visual device: for example, when a software window associated with a disk is closed, the title of the window can be used, along with a date and time, as the data to label the disk when the disk is ejected through port 102.

Because, in the illustrated embodiment, the main surface of disk 10 is of course circular, alphanumeric information is most usefully placed near the diameter of the disk 10, particularly along the direction which disk 10 moves when it emerges from port 102. Thus, one embodiment of the invention provides alphanumeric-capable head 110 toward the widest portion of disk 10 as it moves through port 102; residual characters or images on display 18 (i.e., if any previous characters were placed thereon in a previous writing step) can be erased by supplemental heads 111, which simply provide a charge or other force to erase the areas of display 18 which are not accessible to alphanumeric-capable head 110. Thus, whenever the disk 10 is ejected from port 102, a "clean" set of characters will result, without any image left over from a previous use of the disk.

With reference to the claim language below, the phrase "disposed in the port" shall be construed to encompass any physical relationship or interaction between the media and the port, including insertion or removal of the media relative to the port, as well as when the media is located in the port, such as when the digital data thereon is being read or written.

When packaging a compact disk or cassette (or sets thereof) incorporating the invention, it may be desirable to provide light-transmissive packaging, whereby a display such as 18 may be visible inside the packaging. The display can then be provided with a message thereon, or otherwise including a trademark, which becomes part of the total appearance of the packaged item.

What is claimed is:

1. A memory media, comprising:
    a member for retaining data; and
    an electrically-alterable display attached to the member, the display being alterable through means which are not attached to the member, and wherein there is no circuitry attached to the member.

2. The media of claim 1, wherein the member is a disk.

3. The media of claim 2, wherein the display is disposed over substantially one entire first side of the disk.

4. The media of claim 2, wherein the display is disposed over a first side of the disk and digital data is retained on a second side of the disk.

5. The media of claim 4, wherein the display comprises bichromal balls.

6. The media of claim 1, wherein the display comprises bichromal balls.

7. A data processing device, comprising:

a port for accepting a memory media, the memory media including a member for retaining data and a display attached to the member, the display being alterable through means which are not attached to member, and wherein there is no circuitry attached to the member; and means for altering the display while the memory media is disposed in the port.

8. The device of claim 7, further comprising a disk drive associated with the port.

9. The device of claim 7, further comprising a drawer associated with the port.

10. The device of claim 7, wherein the means for altering the display comprises means for affecting positions of bichromal balls.

11. The device of claim 10, wherein the means for altering the display includes a head for creating images in a bichromal ball display.

12. The device of claim 11, further comprising a drawer associated with the port, and wherein the head creates an image in the display when the drawer causes a member for retaining data to move relative to the port.

* * * * *